United States Patent
Russell et al.

(10) Patent No.: US 11,416,850 B1
(45) Date of Patent: Aug. 16, 2022

(54) PEER TO PEER NAVIGATION SYSTEM AND METHOD

(71) Applicant: UIPCO, LLC, San Antonio, TX (US)

(72) Inventors: Ryan Russell, San Antonio, TX (US); Quian Antony Jones, San Antonio, TX (US); Ashley Raine Philbrick, San Antonio, TX (US); Carlos J P Chavez, San Antonio, TX (US); Stacy Callaway Huggar, San Antonio, TX (US); Janelle Denice Dziuk, Falls City, TX (US); Yevgeniy Khmelev, San Antonio, TX (US); Ravi Durairaj, San Antonio, TX (US); Sumita T. Jonak, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 291 days.

(21) Appl. No.: 16/423,263

(22) Filed: May 28, 2019

Related U.S. Application Data

(60) Provisional application No. 62/785,791, filed on Dec. 28, 2018.

(51) Int. Cl.
  *G06Q 20/38* (2012.01)
  *G06Q 20/04* (2012.01)
  *G06Q 20/32* (2012.01)

(52) U.S. Cl.
  CPC ......... *G06Q 20/381* (2013.01); *G06Q 20/045* (2013.01); *G06Q 20/325* (2013.01); *G06Q 20/3223* (2013.01)

(58) Field of Classification Search
  USPC .................................................. 705/35–45
  See application file for complete search history.

(56) References Cited

U.S. PATENT DOCUMENTS

| | | |
|---|---|---|
| 7,680,738 B2 | 3/2010 | Amann et al. |
| 7,783,571 B2 * | 8/2010 | Fish ....................... G06Q 40/00 705/43 |
| 8,620,368 B2 | 12/2013 | Hansen et al. |
| 8,838,477 B2 | 9/2014 | Moshfeghi |
| 8,849,713 B2 * | 9/2014 | Sivapathasundram ...................... G06Q 20/14 705/39 |
| 9,070,125 B1 * | 6/2015 | Folk .......................... G07F 7/04 |
| 9,204,257 B1 | 12/2015 | Mendelson |
| 9,759,566 B2 | 9/2017 | Ruckart |
| 9,959,512 B2 | 5/2018 | Camp et al. |

(Continued)

OTHER PUBLICATIONS

Mario Loncar et al, "Mobile application for finding ATMs", Conference Paper, MIPRO 2015, pp. 1971-1976. (Year: 2015).*

(Continued)

*Primary Examiner* — Mohammad Z Shaikh
(74) *Attorney, Agent, or Firm* — Plumsea Law Group, LLC

(57) ABSTRACT

A system and method for locating electronic devices and establishing peer to peer communication with electronic devices, such as a currency exchange unit, using a beacon, is disclosed. The method may include determining a location of the currency exchange unit; generating a message indicating a location of the currency exchange unit and the availability of a variety of different currencies; and managing currency exchanges with various mobile devices.

20 Claims, 6 Drawing Sheets

(56) References Cited

U.S. PATENT DOCUMENTS

| | | | |
|---|---|---|---|
| 10,002,387 B2* | 6/2018 | Johnson | G06Q 40/04 |
| 10,055,726 B2 | 8/2018 | Kursun et al. | |
| 10,217,093 B2* | 2/2019 | Trivedi | G06Q 20/3224 |
| 10,223,719 B2 | 3/2019 | Schoeffler | |
| 10,311,422 B2* | 6/2019 | Koeppel | G06Q 20/3221 |
| 2006/0022032 A1* | 2/2006 | Fillinger | G06Q 40/02 |
| | | | 235/379 |
| 2006/0060646 A1* | 3/2006 | Lee | G06Q 20/40 |
| | | | 235/379 |
| 2006/0069503 A1* | 3/2006 | Suomela | G01C 21/3641 |
| | | | 701/431 |
| 2006/0124729 A1* | 6/2006 | Martin | G06Q 20/20 |
| | | | 235/379 |
| 2008/0301047 A1* | 12/2008 | Fish | G06Q 20/105 |
| | | | 705/41 |
| 2010/0114677 A1 | 5/2010 | Carlson et al. | |
| 2010/0243730 A1* | 9/2010 | Safahi | G06Q 30/06 |
| | | | 235/380 |
| 2011/0182250 A1* | 7/2011 | Shin | H04W 4/00 |
| | | | 370/329 |
| 2011/0225087 A1* | 9/2011 | Agrawal | G06Q 10/06315 |
| | | | 705/43 |
| 2011/0238549 A1* | 9/2011 | Poon | G06Q 40/00 |
| | | | 705/35 |
| 2011/0251941 A1* | 10/2011 | Dunwoody | G06Q 20/3221 |
| | | | 705/37 |
| 2012/0160912 A1* | 6/2012 | Laracey | G06F 21/43 |
| | | | 235/379 |
| 2013/0031009 A1 | 1/2013 | Kapoor et al. | |
| 2013/0123310 A1* | 5/2013 | Chong | A61F 6/04 |
| | | | 514/364 |
| 2013/0138561 A1* | 5/2013 | Chan | G06Q 20/3278 |
| | | | 705/41 |
| 2013/0159190 A1* | 6/2013 | Paintin | H04W 4/021 |
| | | | 705/44 |
| 2014/0263618 A1* | 9/2014 | McCarthy | G06Q 40/02 |
| | | | 235/379 |
| 2015/0026031 A1* | 1/2015 | Mullin, III | G06Q 40/04 |
| | | | 705/37 |
| 2015/0058216 A1* | 2/2015 | Luciani | G06Q 20/3276 |
| | | | 705/43 |
| 2015/0095161 A1* | 4/2015 | Goel | G06Q 30/0267 |
| | | | 705/14.64 |
| 2015/0170133 A1 | 6/2015 | Love et al. | |
| 2015/0206117 A1* | 7/2015 | Govindarajan | G06Q 20/204 |
| | | | 705/64 |
| 2016/0078416 A1 | 3/2016 | Deluca et al. | |
| 2016/0140555 A1* | 5/2016 | Scipioni | G06Q 20/381 |
| | | | 705/43 |
| 2016/0180307 A1* | 6/2016 | Laracey | G06Q 20/327 |
| | | | 705/43 |
| 2016/0180411 A1* | 6/2016 | Verbon | G06Q 20/327 |
| | | | 705/329 |
| 2017/0148015 A1* | 5/2017 | Edgington | G06Q 20/3224 |
| 2017/0188183 A1* | 6/2017 | Lihosit | H04W 4/33 |
| 2018/0005320 A1* | 1/2018 | Huang | G06Q 20/3223 |
| 2018/0089668 A1 | 3/2018 | Wong et al. | |
| 2018/0114222 A1* | 4/2018 | Furey | G06Q 20/1085 |
| 2018/0285842 A1* | 10/2018 | Guntupalli | G06Q 20/1085 |
| 2018/0365684 A1* | 12/2018 | Reilly | G06Q 20/06 |
| 2019/0164165 A1* | 5/2019 | Ithabathula | G06F 21/32 |
| 2019/0236581 A1* | 8/2019 | Hartung | G06Q 20/4012 |
| 2020/0005263 A1* | 1/2020 | Arora | G06Q 20/1085 |
| 2020/0118204 A1 | 4/2020 | Chakraborty et al. | |
| 2021/0073760 A1* | 3/2021 | Watson | G07F 19/20 |

OTHER PUBLICATIONS

A. Iqbal, F. Shabnam, N. T. Rouf, I. B. Jafar and K. Raihana, "Implementation of a low cost hybrid Automated Teller Machine (H-ATM) with integrated currency exchange capability," 2012 7th International Conference on Electrical and Computer Engineering, 2012, pp. 929-932. (Year: 2012).*

M. Misbhauddin and M. Alshamari, "Towards a Proximity-Aware, Accessible and Personalized Public Digital Terminal An Initial Study," 2018 21st Saudi Computer Society National Computer Conference (NCC), 2018, pp. 1-6, (Year: 2018).*

R. C. Das, P. P. Purohit, T. Alam and M. Chowdhury, "Location based ATM locator system using OpenStreetMap," The 8th International Conference on Software, Knowledge, Information Management and Applications (SKIMA 2014), 2014, pp. 1-6, (Year: 2014).*

Notice of Allowance dated Nov. 17, 2021 for U.S. Appl. No. 16/400,072.

Non-Final Office Action dated May 3, 2021 for U.S. Appl. No. 16/400,072.

Final Office Action dated Feb. 17, 2021 for U.S. Appl. No. 16/400,072.

Non-Final Office Action dated Aug. 19, 2020 for U.S. Appl. No. 16/400,072.

* cited by examiner

PEER TO PEER NAVIGATION SYSTEM AND METHOD

CROSS-REFERENCE TO RELATED APPLICATIONS

This application claims the benefit of Provisional Patent Application No. 62/785,791 filed Dec. 28, 2018, and titled "Proximity Peer to Peer Navigation System and Method," which is incorporated by reference herein in its entirety.

TECHNICAL FIELD

The present disclosure generally relates to methods and systems for a proximity peer to peer mobile navigation system and method, and in particular, to a system and method for locating a currency exchange unit using a beacon and facilitating an exchange.

BACKGROUND

Electronic payment using a mobile communications device are increasingly popular in a movement toward a cashless market. However, many countries require cash for many purchases. Currency exchange organizations are frequently inconvenient because they are too slow and too few for travelers who need to meet transportation schedules for flights, trains, buses, and other transportation. In addition, these currency exchange organizations are fearful that one or more persons will attempt to steel the currency through violence. Moreover, these currency exchange organizations are concerned about employee theft. Therefore, many currency exchange organizations do not carry enough currency to meet the needs of potential customers, and they run out of currency causing lost opportunities for transactions.

There is a need in the art for a system and method that addresses the shortcomings discussed above.

SUMMARY

In one aspect, a method of establishing peer to peer communication between a mobile communication device and a currency exchange unit and for locating the currency exchange unit using a beacon, includes determining a location of the currency exchange unit; generating and transmitting, using the currency exchange unit, the beacon including a message indicating a location of the currency exchange unit and an availability of a plurality of different currencies; receiving a signal from the mobile communication device requesting peer to peer communication; transmitting, using the currency exchange unit, a response to the request for peer to peer communication to establish the peer to peer communication and to perform authentication; receiving a request for currency exchange including an amount of a requested currency to be provided by the currency exchange unit in exchange for an electronic transfer of currency from the mobile communication device; responding to the request for currency exchange by accepting the request for currency exchange and transmitting a code and the location of the currency exchange unit to the mobile communication device or by declining the request for currency exchange and terminating the peer to peer communication; receiving the code from the mobile communications unit through a user interface of the currency exchange unit to authenticate and electronically transfer funds from an account of a user of the mobile communication device to an account of the currency exchange unit; opening a locker of the currency exchange unit including the amount of the requested currency to remove the amount of the requested currency; receiving a signal of the locker closed; and outputting a receipt to the mobile communication device.

In another aspect, a non-transitory computer readable medium storing software including instructions executable by one or more computers, which, upon such execution, cause the one or more computers to determine a location of a currency exchange unit; generate and transmit, using the currency exchange unit, a beacon including a message indicating a location of the currency exchange unit and an availability of a plurality of different currencies; receive a signal from the mobile communication device requesting peer to peer communication; transmit, using the currency exchange unit, a response to the request for peer to peer communication to establish the peer to peer communication and to perform authentication; receive a request for currency exchange including an amount of a requested currency to be provided by the currency exchange unit in exchange for an electronic transfer of currency from the mobile communication device; respond to the request for currency exchange by accepting the request for currency exchange and transmitting a code and the location of the currency exchange unit to the mobile communication device or by declining the request for currency exchange and terminating the peer to peer communication; receive the code from the mobile communications unit through a user interface of the currency exchange unit to authenticate and electronically transfer funds from an account of a user of the mobile communication device to an account of the currency exchange unit; open a locker of the currency exchange unit including the amount of the requested currency to remove the amount of the requested currency; receive a signal of the locker closed; and output a receipt to the mobile communication device.

In another aspect, a method of establishing peer to peer communication between a mobile communication device and a currency exchange unit and for locating the currency exchange unit using a beacon includes detecting, by the mobile communication device, a beacon transmitted by the currency exchange unit; receiving the beacon including a message and a location of the currency exchange unit; transmitting, by the mobile communication device, a signal requesting peer to peer communication between the mobile communication device and the currency exchange unit and to perform authentication; receiving a response to the signal and establishing peer to peer communication between the mobile communication device and the currency exchange unit; transmitting, by the mobile communication device, a request for currency exchange including an amount of a requested currency to be provided by the currency exchange unit; receiving a response to the request for currency exchange which declines the request for currency exchange and terminates the peer to peer communication or which accepts the request for currency exchange and includes a code and location of the currency exchange unit; accessing a map by the mobile communication device; displaying a mobile communication device icon indicating a location of the mobile computing device and a currency exchange unit icon indicating the location of the currency exchange unit on a display of the mobile computing device; displaying one or more routes from the mobile communication device icon to the currency exchange unit icon on the display; moving the mobile communication device to the location of the currency exchange unit; transmitting the code from the mobile communication device to the currency exchange unit using a user interface of the currency exchange unit; open a locker of the currency exchange unit including the amount of the requested currency to remove the amount of the requested currency; closing the locker; and obtaining a receipt.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The description can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Embodiments provide systems and methods for a proximity peer to peer mobile navigation for locating a currency exchange unit using a beacon and placing a mobile communication device in peer to peer communication with the currency exchange unit to facilitate a currency exchange. Beacons may communicate with mobile communication devices in possession of users in order to connect one or more mobile communication devices with one or more currency exchange units. For example, a mobile communication device may establish peer to peer communication with a currency exchange unit transmitting a beacon. If the mobile communications device detects more than one beacon, the mobile communication device may establish a peer to peer communication with the currency exchange unit, which is closest in proximity to the mobile communication device. If this currency exchange unit is unable to facilitate a currency exchange at this time, the mobile communication device may choose to enter into peer to peer communication with another currency exchange unit, which is the next closest in proximity to the mobile communication device.

By providing peer to peer communication, information can be exchanged and displayed to the users of mobile communication devices in order to facilitate a currency exchange. For example, the display may show one or more routes on a map for a user of a mobile communication device to follow in order to arrive at a currency exchange unit closest in proximity to the user in possession of the mobile communication device. In addition, before moving toward the currency exchange unit, the display of the mobile communications device may indicate whether the currency exchange unit has a sufficient amount for currency for the traveler. For example, if the user desires one hundred Canadian dollars in cash and the currency exchange unit has one hundred Canadian dollars in cash, then the user of the mobile communication device can move toward this available currency exchange unit and use the currency exchange unit to exchange currency. However, if the currency exchange unit does not have sufficient funds and detects other currency exchange units, the mobile communication device or currency exchange unit can terminate the peer to peer communication and the mobile communication device can enter into peer to peer communication with another currency exchange unit. Therefore, the user of the mobile communication device does not waste time visiting multiple currency exchange units which cannot facilitate an exchange of currency.

Various embodiments are disclosed using a beacon to facilitate currency exchanges between users of mobile communications devices in need of cash in one or more currencies in exchange for an electronic transfer of money from the account of the user of the mobile communication device to the account of the currency exchange unit.

Figure 1:
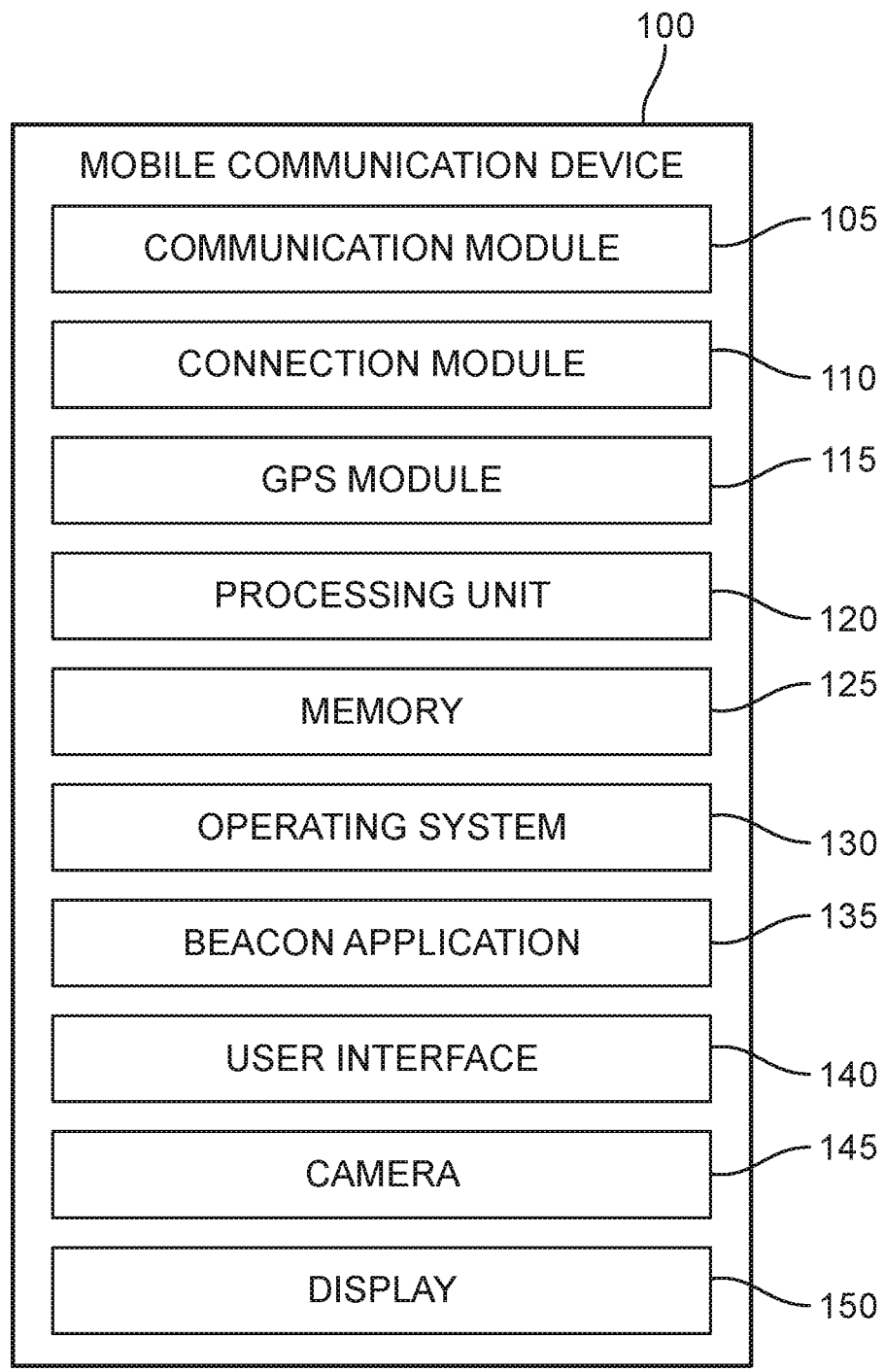
FIG. 1 is a schematic view of a mobile communication device. according to an embodiment.

FIG. 1 is a schematic view of a mobile communication device 100 according to an embodiment. Mobile communication device 100 may be any mobile computing device. Examples of mobile communication device 100 include a smartphone, a tablet, a smartwatch, a smart glass, a smart helmet, and a laptop. A mobile communication device 100 may include a communication module 105, a connection module 110, a GPS module 115, a processing unit 120, a memory 125, an operating system 130, a beacon application 135, user interface 140, a camera 145, and a display 150. The mobile communication device 100 may also store additional applications, which are not shown.

The GPS module 115 may be a global positioning system which determines the current location of the mobile communication device 100. A GPS module (GPS unit) 115 may be software and/or hardware designed to determine the current location of the mobile communication device 100. The GPS module 115 may also act as a GPS transmitter or receiver to facilitate the transmission or reception of GPS coordinates. The GPS module 115 and/or another application may be used to show one or more routes between a mobile communication device and a currency exchange unit in peer to peer communication. The GPS module 115 may store a map or may be capable of communicating over a network such as the Internet to access a map so that the location of the mobile communication device 100 can be displayed on a display 150. Alternatively, a separate application on the mobile communication device 100 may be used to access a map and communicate with the user interface 140 of display 150 to display the location of the mobile communication device 100 on the map displayed by the display 150. In addition, the GPS module 115 or a separate application can also communicate with the user interface 140 of display 150 to display a location of one or more currency exchange units.

In an embodiment, if a user of the mobile communication device 100 activates beacon application 135 and if a mobile communication device 100 detects a beacon from a currency exchange unit, a peer to peer communication (a peer to peer session) may be automatically established between a currency exchange unit and the mobile communication device 100 detecting the beacon. Once this peer to peer communication is established, other peer to peer communications may or may not be established depending on the embodiment. In this exemplary embodiment, the automatically established peer to peer communication is between the mobile communication device 100 and the closest currency exchange unit in proximity to the mobile communication device 100.

In another embodiment, a mobile communication device 100 may detect a beacon and automatically form an initial peer to peer connection with a currency exchange unit which generated the beacon. However, a mobile communication device 100 may permit the operator or user of the mobile communication device 100 to choose to respond to the beacon transmitted by the currency exchange unit to establish a peer to peer communication (peer to peer session) for further communication. Alternatively, the mobile communication device 100 may be in peer to peer communication with more than one currency exchange unit based on detection of one or more beacons.

A beacon may provide wireless communication between mobile communication device 100 and one or more currency exchange units. For example, a beacon may be transmitted and received through Bluetooth, Bluetooth Low Energy (BLE), Wi Fi, Wi Fi Direct, Long Term Evolution (LTE) Direct, Near Field communication (NFC), or other wireless communication protocols. Alternatively, a beacon may be concurrently transmitted and received through one or more of Bluetooth, Bluetooth Low Energy (BLE), Wi Fi, Wi Fi Direct, Long Term Evolution (LTE) Direct, Near Field communication (NFC), or other wireless communication protocols. Other mobile communication devices may have a configuration the same as or similar to the configuration of mobile communication device 100 in FIG. 1.

A connection module 110 of a mobile communication device 100 may execute specialized hardware and/or software to passively monitor for the various wireless communications, for example, through a communication module 105. When a mobile communication device 100 detects a beacon while the beacon application 135 is activated by a user, both the currency exchange unit transmitting the beacon and the mobile communication device 100 receiving the beacon may ramp up in power and establish a peer to peer connection. The mobile communication device 100 having a beacon application 135 is registered with a service provider having a server, so that the service provider can be used to electronically transmit currency or electronically receive currency. A currency exchange unit may also be registered with the service provider to electronically transmit or receive currency. The service provider coordinates the electronic transfer of currency between accounts of a user of mobile communication device 100 and a currency exchange unit including providing mutual authentication.

Mutual authentication by both mobile communication device 225A and currency exchange unit 300 may be required by the service provider 200. In order to conduct a transaction, one or more various types of mutual authentication may be required such as biometric authentication. For example, in order for mobile communication device 225A and currency exchange unit 300 to allow users to conduct a transaction, the user of the mobile communication device 225A may be required to provide a fingerprint or other biometric information to unlock a vault containing a private key in a trusted execution environment (TEE) or a Trusted Platform Module (TPM). The user may have his or her own private key associated with the biometric authentication. This private key enables a user to sign and encrypt information to conduct an electronic transaction. The currency exchange unit 300 may also have its own private key in a trusted execution environment (TEE) or a Trusted Platform Module (TPM) in a vault that may be unlocked for mutual authentication after the private key of the user of the mobile communication device 225A has been authenticated to provide mutual authentication. Other types of mutual authentication may also be used. Therefore, the user may be confident about the integrity of the electronic transaction.

The connection may further enable the mobile communication device 100 and the currency exchange unit to communicate additional information, such as connection information (e.g., an identifier) and/or other stored data (e.g., a location or other information). In addition, this connection may permit users of the mobile communication devices 100 to communicate information inputted through a user interface 140 or camera 145 and displayed on display 150.

A user interface 140 of the mobile communication device 100 may include a microphone, a speaker, a keypad, a screen, a touch screen, a cursor control device, a light, a voice recognition system, an optical recognition system that would authenticate a user's iris, for example, and/or any other type of interface that may be employed in the wireless terminal. In some embodiments, the user interface 140 may include therewith ability to service a headset including a microphone and an earpiece for the user.

The processing unit 120 may include any type of processor such as a microprocessor, a digital signal processor, an Application Specific Integrated Circuit (ASIC), or a combination of processing type devices. The processing unit 120 is operable to execute a plurality of software instructions that are stored in memory 125 and downloaded for execution. The plurality of software instructions may include operating system 130, beacon application 135, and other applications. The processing unit 120 may also include specialized hardware required to implement aspects of embodiments. The memory 125 may include SRAM, DRAM, PROM, EEPROM, flash RAM, a hard disk drive, an optical media drive, or any other type of memory capable of storing data and instructions.

Figure 2:
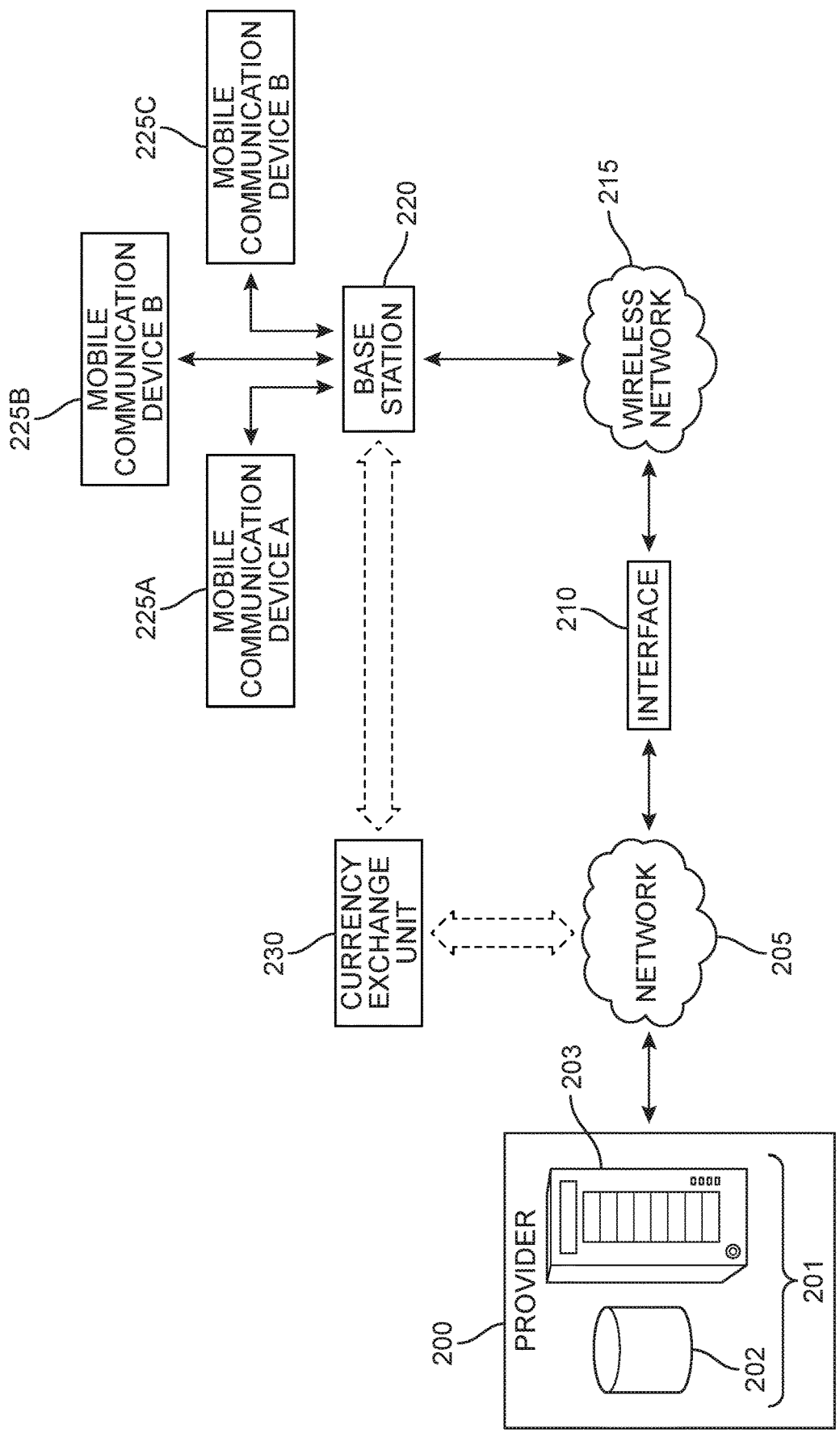
FIG. 2 is a schematic view of a mobile communication device of FIG. 1 and a currency exchange unit in a network system according to an embodiment.

FIG. 2 is a schematic view of a plurality of mobile communication devices 100 of FIG. 1 and a currency exchange unit 230 in a network system according to an embodiment. FIG. 2 is a system diagram illustrating a wireless communication system that operates according to an embodiment. The network system includes a service provider 200 coupled to a network 205 (e.g. the Internet), which may use an interface 210 to couple the network 205 with a wireless network 215. The wireless network 215 communicates with one or more servicing base stations and/or wireless access points 220. It should be noted that FIG. 2 is used only to convey the principles of embodiments and is not intended to be a detailed description of a wireless communication system such as a Wireless Local Area Network (WLAN), a Wireless Wide Area Network (WWAN), or a Wireless Personal Area Network (WPAN). One or more base stations 220 may communicate with one or more mobile communication devices 100. For illustration purposes, the one or more mobile communication devices 100 may be mobile communication device 225A, mobile communication device 225B, and mobile communication device 225C. FIG. 2 also shows a currency exchange unit 230, which may be wirelessly coupled to a base station 220 or couples wired or wirelessly to a network 205 (e.g., the Internet), which is coupled to a service provider 200.

Referring to FIG. 2, service provider 200 may include a centralized computing system 201. The term "computing system" refers to the computing resources of a single computer, the partial computing resources of a single computer, a plurality of computers communicating with one another, or a network of remote servers. In an exemplary embodiment, computing system 201 includes at least one server. A centralized computing system 201 includes one or more computing devices 202 (for example, a server) that may be in communication with one or more databases 203 (memories). Computing device 202 may include one or more processors and a non-transitory computer readable medium. Instructions stored on the non-transitory computer readable medium may be executed by the one or more processors. Databases 203 could be co-located with computing device 201 or could be remote databases that are accessible by computing device 201 over network 205 and/or wireless network 215. Databases 203 can include any kind of storage devices, including but not limited magnetic, optical, magneto-optical, and/or memory, including volatile memory and non-volatile memory.

Figure 3:
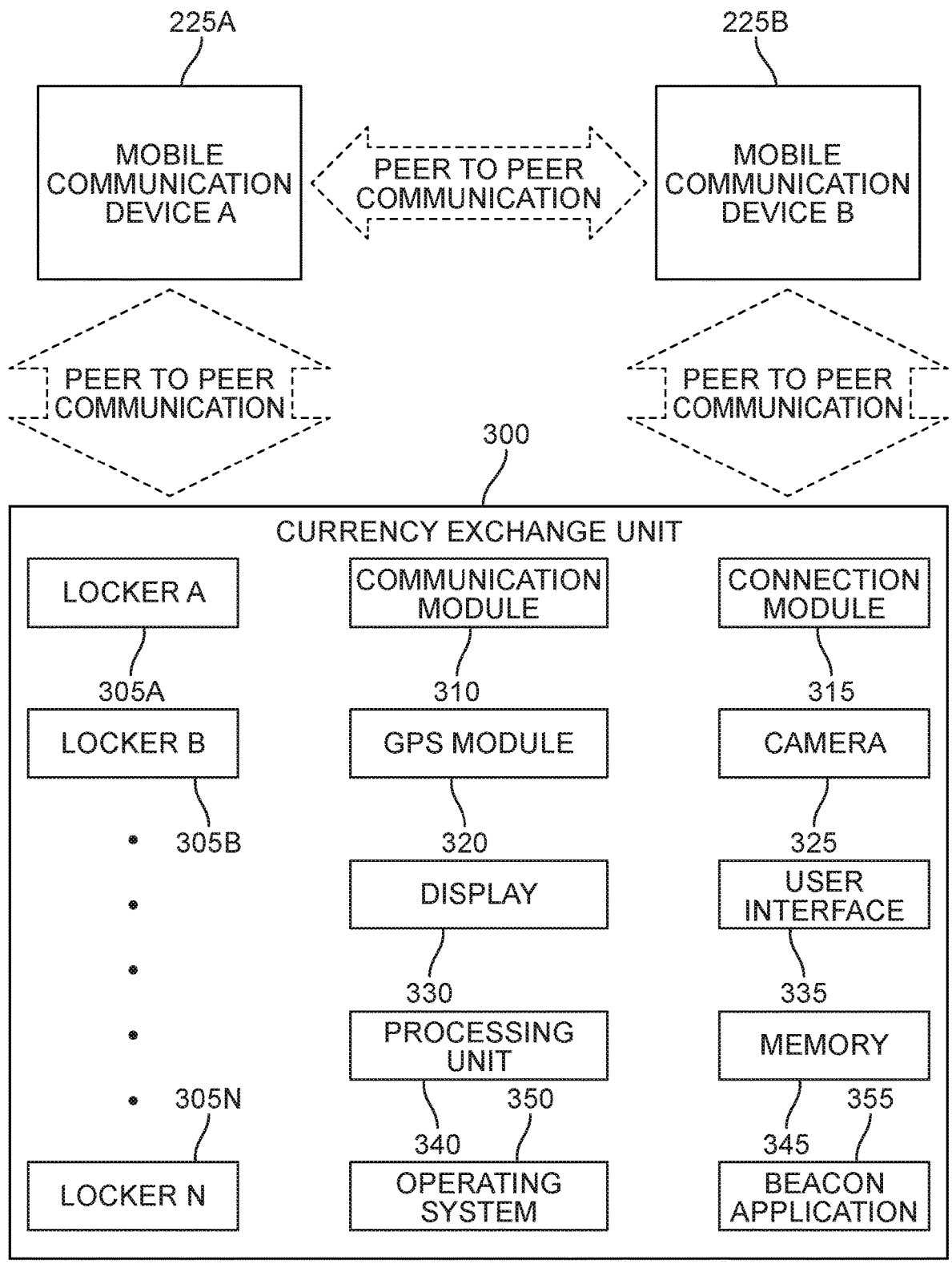
FIG. 3 is a schematic view of a mobile communication device of FIG. 1 in peer to peer communication with a currency exchange unit according to an embodiment.

FIG. 3 is a schematic view of mobile communication devices 100 of FIG. 1, which can be in peer to peer communication with each other and/or a currency exchange unit such as currency exchange unit 230 shown in FIG. 2, according to an embodiment. The currency exchange unit 300 shown in FIG. 3 may be the same as the currency exchange unit 230 shown in FIG. 2. The currency exchange unit 300 may include a plurality of lockers such as lockers A ... N designated by reference numerals 305A ... 305N. As an example, this exemplary embodiment refers to locker A 305A and refers to mobile communication device 225A. The currency exchange unit 300 may also include communication module 310, connection module 315, GPS module 320, camera 325, display 330, user interface 335, processing unit 340, memory 345, operating system 350, and beacon application 355. The currency exchange unit 300 may have additional applications as well.

As discussed above, a beacon may provide wireless communication between mobile communication device 225A and one or more currency exchange units 300. For example, a beacon may be transmitted and received through Bluetooth, Bluetooth Low Energy (BLE), Wi Fi, Wi Fi Direct, Long Term Evolution (LTE) Direct, Near Field communication (NFC), or other wireless communication protocols. Alternatively, a beacon may be concurrently transmitted and received through one or more of Bluetooth, Bluetooth Low Energy (BLE), Wi Fi, Wi Fi Direct, Long Term Evolution (LTE) Direct, Near Field communication (NFC), or other wireless communication protocols. Beacon application 355 may generate the beacon for transmission by the currency exchange unit 300. The beacon may include the location of the currency exchange unit 300 as well as an advertisement of currency exchange availability and an invitation for peer to peer communication. The GPS module 320 may determine the location of the currency exchange unit 300, which may be utilized by the beacon application 355 to generate the beacon.

A connection module 315 of a currency exchange unit 300 may execute specialized hardware and/or software to passively monitor for the various wireless communications, for example, through a communication module 310. When a currency exchange unit 300 detects a response to its transmitted beacon, both the currency exchange unit 300 transmitting the beacon and the mobile communication device 225A receiving the beacon may ramp up in power and establish a peer to peer connection and may perform mutual authentication. The mobile communication device 225A having a beacon application 135 is registered with a service provider 200 having a server, so that the service provider 200 can be used to electronically transmit currency or electronically receive currency. The currency exchange unit 300 may also be registered with the service provider 200 to electronically transmit or receive currency. The service provider 200 coordinates the electronic transfer of currency between accounts of a user of mobile communication device 225A and a currency exchange unit 330 including providing mutual authentication. An example of mutual authentication is discussed above. The connection may further enable the mobile communication device 225A and the currency exchange unit to communicate additional information, such as connection information (e.g., an identifier) and/or other stored data (e.g., a location or other information).

A display 330 of the currency exchange unit 330 may display information to a user of the mobile communication device 225A. A user interface 335 of the currency exchange unit 300 may include a microphone, a speaker, a keypad, a screen, a touch screen, a cursor control device, a light, a voice recognition system, an optical recognition system that would authenticate a user's iris, for example, and/or any other type of interface that may be employed in the wireless terminal. In some embodiments, the user interface 330 may include therewith ability to service a headset including a microphone and an earpiece for the user. The camera 325 of the currency exchange unit 300 may also be used to take a picture or video of a user of the mobile communication device 225A or a picture or video the display 150 of the mobile communication device 225A. Alternatively, as discussed above, the user interface 335 may interface with the mobile communications device 225A or the user of the mobile communications device 225A.

The processing unit 340 may include any type of processor such as a microprocessor, a digital signal processor, an Application Specific Integrated Circuit (ASIC), or a combination of processing type devices. The processing unit 340 is operable to execute a plurality of software instructions that are stored in memory 345 and downloaded for execution. The plurality of software instructions may include operating system 350, beacon application 355, and other applications (not shown). The processing unit 340 may also include specialized hardware required to implement aspects of embodiments. The memory 345 may include SRAM, DRAM, PROM, EEPROM, flash RAM, a hard disk drive, an optical media drive, or any other type of memory capable of storing data and instructions.

Figure 4:
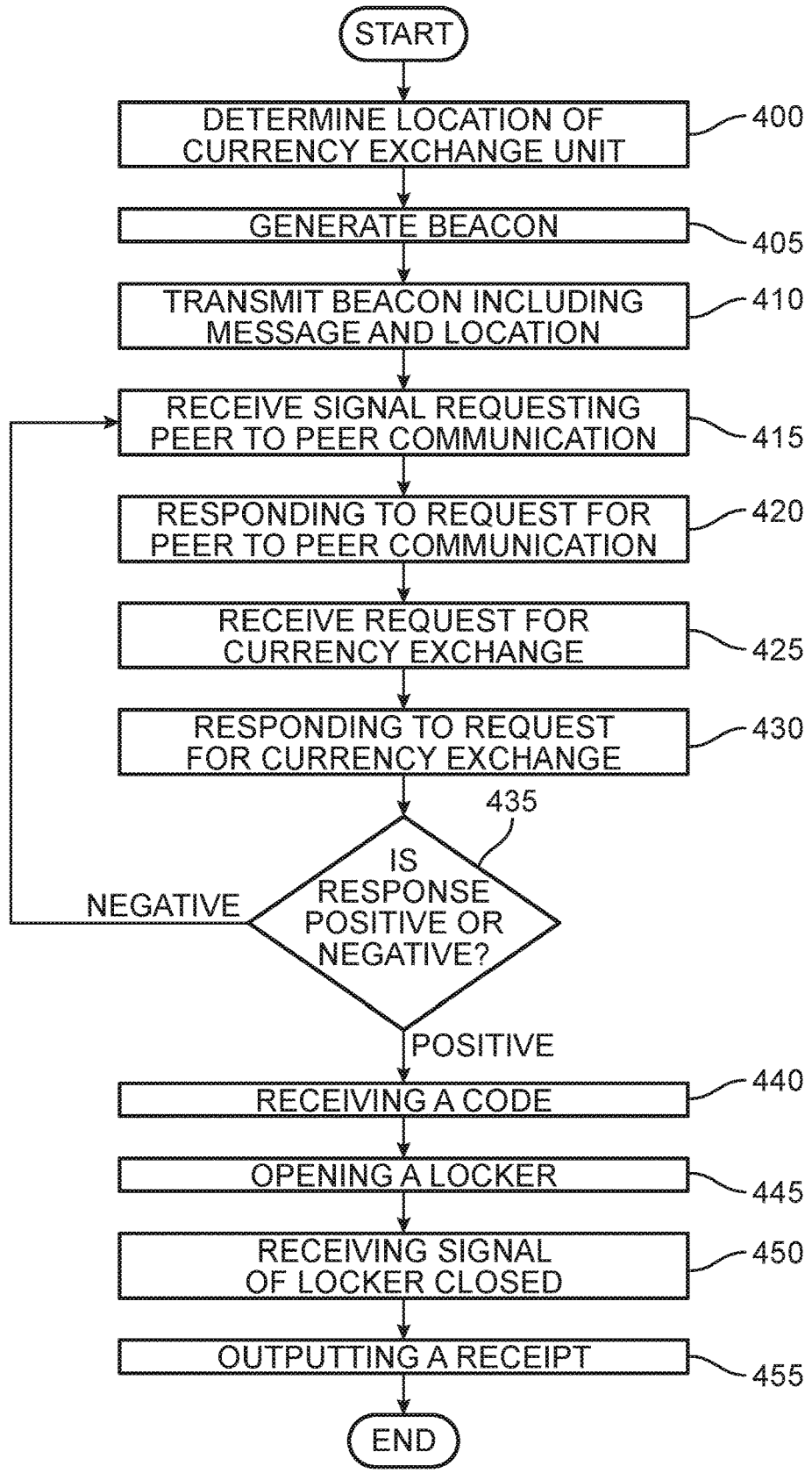
FIG. 4 shows a flowchart illustrating a process for a transmission of a beacon according to an embodiment.

FIG. 4 shows a flowchart illustrating a process for a transmission of a beacon according to an embodiment. With respect to FIG. 4, reference will also be made to mobile communication device 225A and currency exchange unit 300 of FIG. 3. As discussed above, mobile communication device 225A may have the same configuration as mobile communication device 100 in FIG. 1. As indicated in FIG. 4, the currency exchange unit 300 may determine a location of the currency exchange unit 300 (operation 400). For example, currency exchange unit 300 may be positioned in an international airport terminal for the convenience of travelers. Currency exchange unit 300 may generate a beacon using beacon application 355 (operation 405) and transmit the beacon including a message and a location (operation 410). The message may include information regarding the different currencies which may be available for purchase at the currency exchange unit 300.

In response to the transmitted beacon, the currency exchange unit 300 may receive a signal requesting peer to peer communication from a mobile communication device 225A (operation 415). The mobile communication device 225A having a beacon application 135 is registered with a service provider 200 having a server, so that the service provider 200 can be used to electronically transmit currency or electronically receive currency. The currency exchange unit 300 may also be registered with the service provider 200 to electronically transmit or receive currency. The service provider 200 coordinates the electronic transfer of currency between accounts of a user of mobile communication device 225A and a currency exchange unit 330 including providing mutual authentication. The currency exchange unit 300 may respond to the request for peer to peer communication by establishing peer to peer communication with mobile communication device 225A and initiating mutual authentication as part of the response (operation 420).

As discussed above, mutual authentication by both mobile communication device 225A and currency exchange unit 300 may be required by the service provider 200. In order to conduct a transaction, one or more various types of mutual authentication may be required such as biometric authentication. For example, in order for mobile communication device 225A and currency exchange unit 300 to allow users to conduct a transaction, the user of the mobile communication device 225A may be required to provide a fingerprint or other biometric information to unlock a vault containing a private key in a trusted execution environment (TEE) or a Trusted Platform Module (TPM). The user may have his or her own private key associated with the biometric authentication. This private key enables a user to sign and encrypt information to conduct an electronic transaction. The currency exchange unit 300 may also have its own private key in a trusted execution environment (TEE) or a Trusted Platform Module (TPM) in a vault that may be unlocked for mutual authentication after the private key of the user of the mobile communication device 225A has been authenticated to provide mutual authentication. Other types of mutual authentication may also be used. Therefore, the user may be confident about the integrity of the electronic transaction.

The currency exchange unit 300 may receive a request for currency exchange through peer to peer communication with the mobile communication device 225A (operation 425). After receiving the request, the currency exchange unit 300 determines whether the currency exchange unit 300 has the requested currency in one of the lockers A-N denoted by reference numeral 305A-305N in FIG. 3 and transmits a response to the mobile communication device 225A (operations 430 and 435 in FIG. 4). If the response transmitted to the mobile communication device 225A indicates that the currency exchange unit 300 cannot process the request, the currency exchange unit 300 can terminate the peer to peer communication with mobile communication device 225A after notifying the mobile communication device 225A that the currency exchange unit 300 cannot perform the requested currency exchange (operation 430 and operation 435—negative response). The currency exchange unit 300 can then receive another signal requesting peer to peer communication from another mobile communication device such as mobile communication device 225B. In addition, mobile communication device 225A can search for a new beacon from another currency exchange unit.

If the currency exchange unit 300 can perform the currency exchange, then the currency exchange unit 300 transmits a response to the mobile communication 225A, which notifies the mobile communication device 225A that the currency exchange unit 300 can perform the requested exchange and which provides a code to the mobile communication device 225A (operation 430 and operation 435—positive response). If the response transmitted to the mobile communication device 225A indicates that the currency exchange unit 300 can process the request (operation 430 and operation 435—positive response), the currency exchange unit 300 awaits entry of this code. Once the currency exchange unit 300 receives a code (operation 440) by way of the user interface 335, an electronic payment may be transmitted from an account accessed by the mobile communication device 225A to an account of the currency exchange unit 300 (operation 440) and one of the lockers 305A to 305N may be opened (operation 445). The code may be one or any combination of a QR code, a universal product code (UPC) i.e. UPC barcode, a random alphanumeric string of predetermined length, a dynamic imagery, a dual-tone multifrequency (DTMF) sequence, a biometric code, and infrasonic microphone sounds. The use of this code adds additional authentication and security to the process. The number of the opened locker 305 may be displayed on display 330 or sent to the mobile communication device 225A (operation 445). A user of the mobile communication device 225A removes the requested currency from the locker and closes the locker 305. The locker 305 sends a signal to the currency exchange unit 300 that the locker 305 is closed (operation 450) and a receipt is outputted (operation 455). The outputted receipt may be a printed receipt, an electronic receipt, or both a printed receipt and an electronic receipt.

Figure 5A:
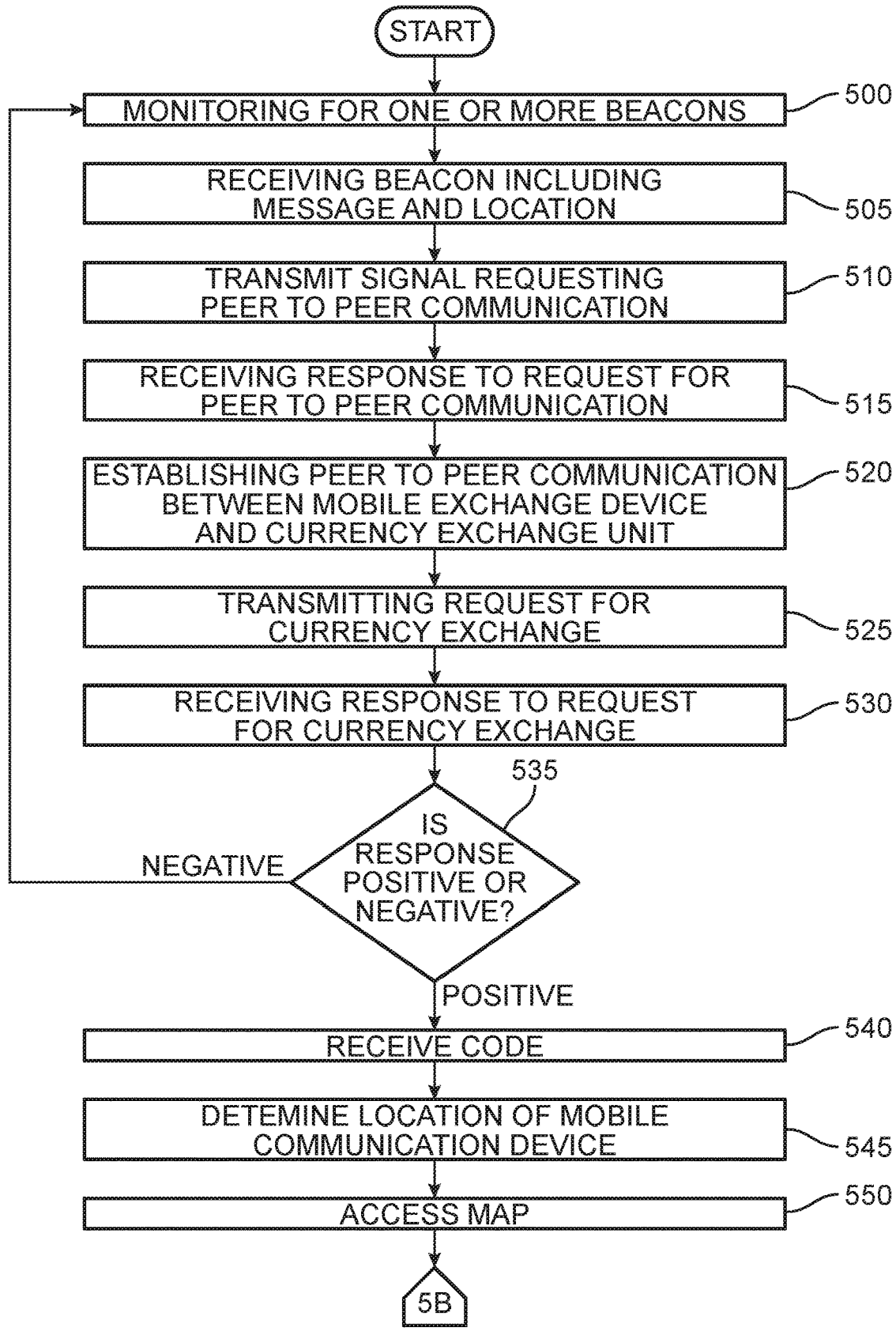
FIGS. 5A-5B show a flowchart illustrating a process for receiving a beacon according to an embodiment.
Figure 5B:
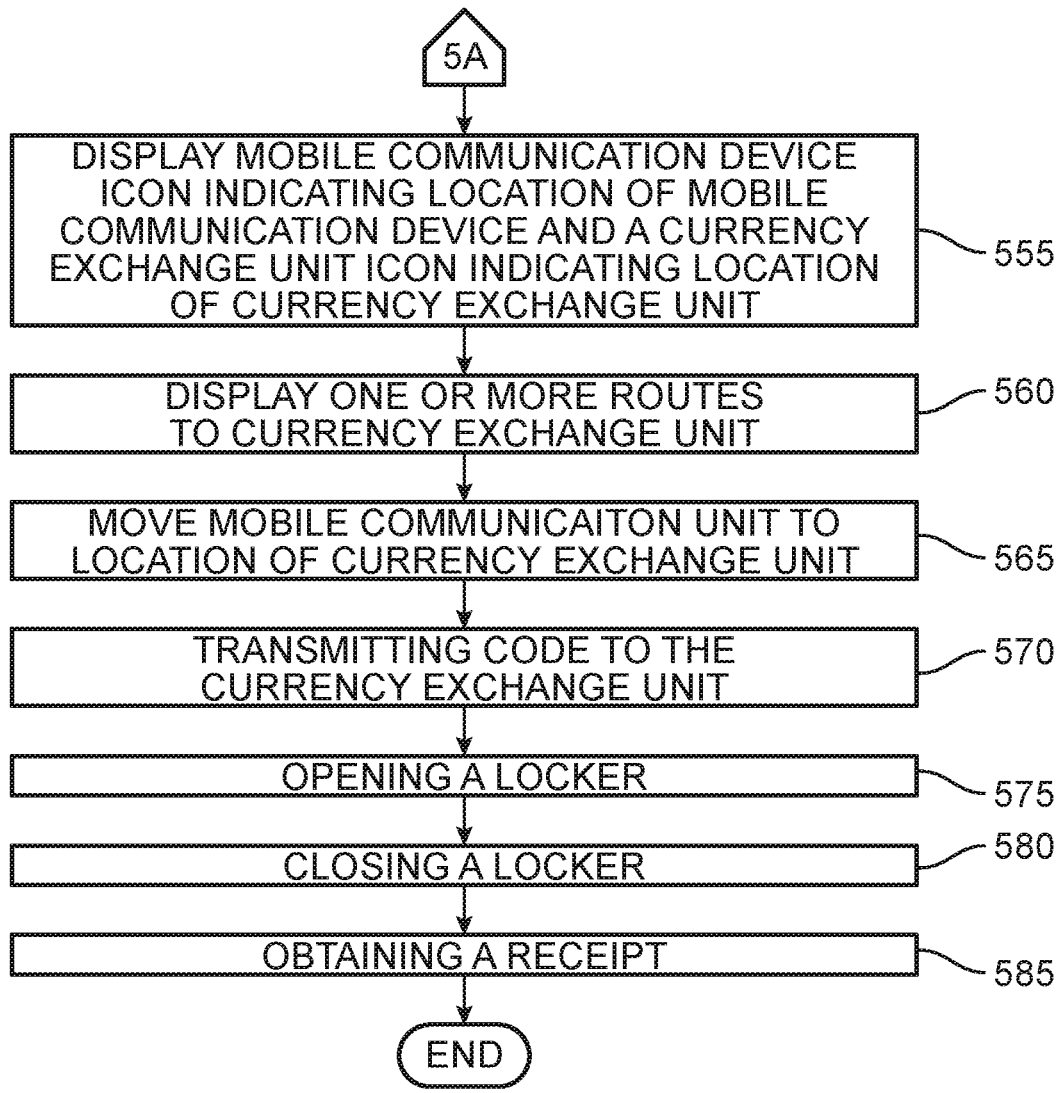

FIGS. 5A-5B show a flowchart illustrating a process for receiving a beacon according to an embodiment. With respect to FIGS. 5A-5B, reference will also be made to mobile communication device 225A and currency exchange unit 300 of FIG. 3. As discussed above, mobile communication device 225A may have the same configuration as mobile communication device 100 in FIG. 1. As indicated in FIG. 5A, a mobile communication device 225A monitors or searches for one or more beacons (operation 500). For example, a user may have activated a beacon application 135 of the mobile communication device 225A to monitor or search for the beacon and automatically transmit a signal in response to receiving a beacon signal. An example of a beacon is a beacon generated by a currency exchange unit 300. If the mobile communication device 225A receives a beacon including a message and location (operation 505), the mobile communication device 225A may transmit a signal requesting peer to peer communication (operation 510).

The mobile communication device 225A having a beacon application 135 is registered with a service provider 200 having a server, so that the service provider 200 can be used to electronically transmit currency or electronically receive currency. The currency exchange unit 300 may also be registered with the service provider 200 to electronically transmit or receive currency. The service provider 200 coordinates the electronic transfer of currency between accounts of a user of mobile communication device 225A and a currency exchange unit 330 including providing mutual authentication. If the mobile communication device 225A receives a positive response to the request for peer to peer communication from the currency exchange unit 300 (operation 515), the mobile communication device 225A and the currency exchange unit 300 may establish a peer to peer communication and initiate mutual authentication (operation 520).

As discussed above, mutual authentication by both mobile communication device 225A and currency exchange unit 300 may be required by the service provider 200. In order to conduct a transaction, one or more various types of mutual authentication may be required such as biometric authentication. For example, in order for mobile communication device 225A and currency exchange unit 300 to allow users to conduct a transaction, the user of the mobile communication device 225A may be required to provide a fingerprint or other biometric information to unlock a vault containing a private key in a trusted execution environment (TEE) or a Trusted Platform Module (TPM). The user may have his or her own private key associated with the biometric authentication. This private key enables a user to sign and encrypt information to conduct an electronic transaction. The currency exchange unit 300 may also have its own private key in a trusted execution environment (TEE) or a Trusted Platform Module (TPM) in a vault that may be unlocked for mutual authentication after the private key of the user of the mobile communication device 225A has been authenticated to provide mutual authentication. Other types of mutual authentication may also be used. Therefore, the user may be confident about the integrity of the electronic transaction.

The mobile communication device 225A may transmit a request for currency exchange (operation 525), and receive a response to the request for the currency exchange from the currency exchange unit 300 (operation 530). If the response received by the mobile communication device 225A indicates that the currency exchange unit 300 cannot process the request, the mobile communication device 225A can terminate the peer to peer communication with the currency exchange unit 300 (operation 535—negative response). For example, currency exchange unit 300 may not have the proper currency or the proper amount of currency. The mobile communication device 225A can monitor or search for a next beacon of a next currency exchange unit 300 (operation 500) such as mobile communication device 225B. Alternatively, If the currency exchange unit 300 can perform the currency exchange, then the mobile communication 225A receives a response from the currency exchange unit 300 that the currency exchange unit 300 can perform the requested exchange (positive response). If the response is positive (operation 535), the mobile communication device 225A receives a code (operation 540) from the currency exchange unit 300 as indicated in FIG. 5A.

As indicated in FIG. 5A, the mobile communication device 225A may determine its location by using GPS module 115 (operation 545). As indicated above, in operation 505, the mobile communication device 225 may have already received the location of the currency exchange unit 300. The mobile communication device 225A may access a map (operation 550), and display on the map a mobile communication device icon indicating the current location of the mobile communication device 225A and a currency exchange unit icon indicating the location of a currency exchange unit 300 (operation 555 in FIG. 5B). The mobile communication device 225A may also display one or more routes to the currency exchange unit 300 (operation 560), so that the user can move the mobile communication device 225A to the location of the currency exchange unit 300 (operation 565).

After the user arrives at the location of the currency exchange unit 300, the mobile communication device 225A may transmit the code to the currency exchange unit (operation 570) by using the user interface 140 and/or the user interface 335. The code may be one or any combination of a QR code, a universal product code (UPC) i.e. UPC barcode, a random alphanumeric string of predetermined length, a dynamic imagery, a dual-tone multifrequency (DTMF) sequence, a biometric code, and infrasonic microphone sounds. The use of this code adds additional authentication and security to the process.

Once the currency exchange unit 300 receives the code, an electronic payment may be transmitted from an account accessed by the mobile communication device 225A to an account of the currency exchange unit 300 (operation 570) and one of the lockers 305A to 305N may be opened by the user (operation 575). The number of the opened locker 305 may be displayed on display 330 or received by the mobile communication device 225A (operation 575). A user of the mobile communication device 225A removes the requested currency from the locker 305 and closes the locker 305. The user closes the locker 305 (operation 580), and the locker 305 sends a signal to the currency exchange unit 300 that the locker 305 is closed, Thereafter, a receipt is outputted so that the user can obtain the receipt (operation 585). The outputted receipt may be a printed receipt, an electronic receipt, or both a printed receipt and an electronic receipt.

FIGS. 3-5B show some embodiments. However, other embodiments are contemplated. For example, instead of a plurality of lockers 305A . . . 305N, the currency exchange unit 300 may dispense a desired currency from inside the currency exchange unit 300 after the currency exchange unit 300 receives an electronic transfer of currency from the mobile communication unit 225A.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

A non-transitory computer readable medium may store software comprising instructions executable by one or more computing devices (computers).

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

One or more embodiments may utilize any kind of network (wired or wireless) for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A currency exchange unit configured to provide a peer to peer currency exchange, the currency exchange unit providing physical currency, comprising:
   at least one computing processing device;
   at least one locker; and
   a plurality of modules, wherein the at least one computing processing device, executing the plurality of modules comprises:
   a Global Positioning System (GPS) module, disposed within the currency exchange unit, configured to determine a location of the currency exchange unit;
   a beacon module, configured to generate and transmit a beacon including a message indicating the location of the currency exchange unit and an availability of a plurality of different currencies to a mobile communication device using Near Field Communication;
   a communication module, disposed within the currency exchange unit, configured to:
   receive an indication from the mobile communication device requesting peer to peer communication;
   transmit a response to the request for peer to peer communication to establish the peer to peer communication and perform authentication;
   receive a request for currency exchange including an amount of a requested currency to be provided by the currency exchange unit in exchange for electronically transferring currency from the mobile communication device; and
   respond to the request for the currency exchange by accepting the request for currency exchange and transmitting a code generated by the currency exchange unit used for additional authentication and to confirm that the currency exchange unit is able to perform the currency exchange and to provide the location of the currency exchange unit to the mobile communication device; and
   a user interface, disposed on the currency exchange unit, configured to receive the code from the mobile communication device to authenticate and electronically transfer currency from an account of a user of the mobile communication device to an account of the currency exchange unit,
   wherein, prior to the electronically transferring currency from the account of the user of the mobile communication device to the account of the currency exchange unit, the currency exchange unit authenticates the electronic transfer using an encryption key of the user, the encryption key of the user being obtained using biometric information from the user,
   wherein the currency exchange unit includes the at least one locker, disposed on the currency exchange unit,
   wherein the currency exchange unit unlocks the at least one locker of the currency exchange unit including the amount of the requested currency allowing removal of the amount of the requested currency and uses the code to perform an authentication confirming the removal,
   wherein the currency exchange unit receives a signal of the at least one locker being closed, and
   wherein the currency exchange unit outputs a receipt to the mobile communication device.

2. The currency exchange unit of claim 1, wherein the mobile communication device comprises one of a smartphone, a tablet, a smartwatch, a smart glass, a smart helmet, and a laptop.

3. The currency exchange unit of claim 1, wherein the beacon module is further configured to update availability of the plurality of different currencies after the locker is closed.

4. The currency exchange unit of claim 3, wherein the beacon module is further configured to generate and transmit a next beacon including the location of the currency exchange unit and the updated availability of the plurality of currencies.

5. The currency exchange unit of claim 1, wherein the mutual authentication also uses an encryption key of the currency exchange unit, obtained after receiving the biometric information.

6. The currency exchange unit of claim 5, wherein the encryption key of the user and the encryption key of the currency exchange unit are each obtained from a respective vault hosted by a respective trusted third party.

7. The currency exchange unit of claim 1, wherein the code is at least one of a universal product code (UPC), UPC barcode, a random alphanumeric string of predetermined length, a dynamic imagery, a dual-tone multifrequency (DTMF) sequence, a biometric code, and infrasonic microphone sounds.

8. A currency exchange unit configured to provide a peer to peer currency exchange, the currency exchange unit providing physical currency, comprising:
   at least one computing processing device;
   at least one locker; and
   a plurality of modules, wherein the at least one computing processing device, executing the plurality of modules comprises:
   a Global Positioning System (GPS) module, disposed within the currency exchange unit, configured to determine a location of the currency exchange unit;
   a beacon module, configured to generate and transmit, using the currency exchange unit, a beacon including a message indicating the location of the currency exchange unit and an availability of a plurality of different currencies to a mobile communication device using Near Field Communication;
   a communication module, disposed within the currency exchange unit, configured to:
   receive an indication from the mobile communication device requesting peer to peer communication;
   transmit a response to the request for peer to peer communication to establish the peer to peer communication and to perform authentication;
   receive a request for currency exchange including an amount of a requested currency to be provided by the currency exchange unit in exchange for electronically transferring of currency from the mobile communication device; and
   respond to the request for currency exchange by accepting the request for currency exchange and transmitting a code generated by the currency exchange unit used for additional authentication and to confirm that the currency exchange unit is able to perform the currency exchange and to provide the location of the currency exchange unit to the mobile communication device; and
   a user interface, disposed on the currency exchange unit, configured to receive the code from the mobile communication device to authenticate and electronically transfer currency from an account of a user of the mobile communication device to an account of the currency exchange unit,
   wherein the currency exchange unit includes the at least one locker, disposed on the currency exchange unit;
   wherein the currency exchange unit unlocks the at least one locker of the currency exchange unit including the amount of the requested currency allowing removal of the amount of the requested currency and uses the code to perform an authentication confirming the removal,
   wherein the currency exchange unit receives a signal of the at least one locker being closed, and
   wherein the currency exchange unit outputs a receipt to the mobile communication device.

9. The currency exchange unit of claim 8, wherein the mobile communication device comprises one of a smartphone, a tablet, a smartwatch, a smart glass, a smart helmet, and a laptop.

10. The currency exchange unit of claim 8, wherein the beacon module is further configured to update availability of the plurality of different currencies after the locker is closed.

11. The currency exchange unit of claim 10, wherein the beacon module is further configured to generate and transmit a next beacon including the location of the currency exchange unit and the updated availability of the plurality of currencies.

12. The currency exchange unit of claim 8, wherein the outputting the receipt includes electronically transmitting the receipt to the mobile communication device.

13. The currency exchange unit of claim 12, wherein outputting the receipt includes printing the receipt.

14. The currency exchange unit of claim 12, wherein the code is at least one of a universal product code (UPC), UPC barcode, a random alphanumeric string of predetermined length, a dynamic imagery, a dual-tone multifrequency (DTMF) sequence, a biometric code, and infrasonic microphone sounds.

15. A method for providing a peer to peer currency exchange performed by a plurality of modules, and at least one computing processing device, that executes the plurality of modules, the method comprising:
   determining a location of a currency exchange unit using a Global Positioning System (GPS) module;
   generating and transmitting, using beacon module, a beacon including a message indicating the location of the currency exchange unit and an availability of a plurality of different currencies to a mobile communication device using Near Field Communication;
   receiving an indication from the mobile communication device requesting peer to peer communication;
   transmitting, using the currency exchange unit, a response to the request for peer to peer communication to establish the peer to peer communication and perform authentication;
   receiving a request for currency exchange including an amount of a requested currency to be provided by the currency exchange unit in exchange for electronically transferring of currency from the mobile communication device;
   responding to the request for the currency exchange by accepting the request for currency exchange and transmitting a code generated by the currency exchange unit used for additional authentication and to confirm that the currency exchange unit is able to perform the currency exchange and to provide the location of the currency exchange unit to the mobile communication device;
   receiving the code from the mobile communication device through a user interface of the currency exchange unit to authenticate and electronically transfer currency from an account of a user of the mobile communication device to an account of the currency exchange unit,
   wherein, prior to the electronically transferring currency from the account of the user of the mobile communication device to the account of the currency exchange unit, the currency exchange unit authenticates the electronic transfer using an encryption key of the user, the encryption key of the user being obtained using biometric information from the user, and
   wherein the currency exchange unit includes at least one locker, disposed on the currency exchange unit;
   unlocking the at least one locker of the currency exchange unit including the amount of the requested currency allowing removal of the amount of the requested currency and using the code to perform an authentication confirming the removal;
   receiving a signal of the at least one locker being closed; and
   outputting a receipt to the mobile communication device.

16. The method of claim 15, wherein the mobile communication device comprises one of a smartphone, a tablet, a smartwatch, a smart glass, a smart helmet, and a laptop.

17. The method of claim 15, further comprising generating and transmitting, using the beacon module, a next beacon after the response to the request for currency exchange.

18. The method of claim 15, wherein the mutual authentication also uses an encryption key of the currency exchange unit, obtained after receiving the biometric information.

19. The method of claim 18, wherein the encryption key of the user and the encryption key of the currency exchange unit are each obtained from a respective vault hosted by a respective trusted third party.

20. The method of claim 18, wherein the code is at least one of a universal product code (UPC), UPC barcode, a random alphanumeric string of predetermined length, a dynamic imagery, a dual-tone multifrequency (DTMF) sequence, a biometric code, and infrasonic microphone sounds.

\* \* \* \* \*